June 23, 1925.                                                          1,543,195
J. P. N. THYGESEN ET AL
DEVICE FOR CUTTING UP FETAL AND LIKE OBJECTS IN ANIMALS
Filed July 7, 1921
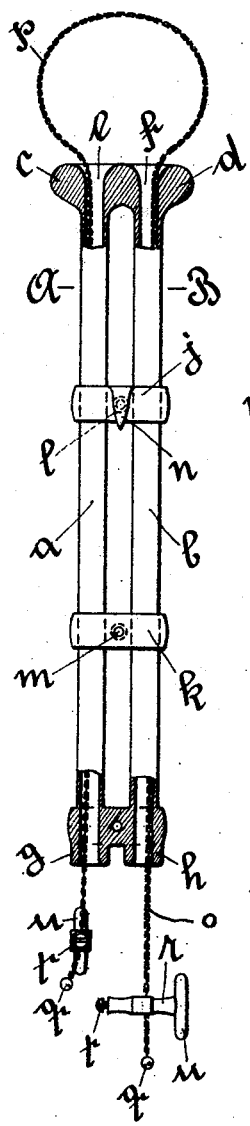
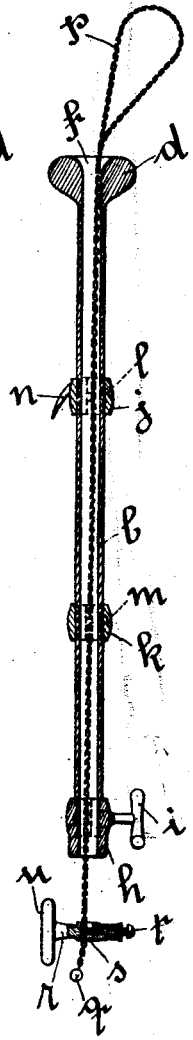
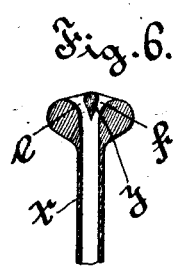
INVENTORS:
Jens Peter Nielsen Thygesen,
Anders Theodor Sørensen,
Niels Peter Sørensen.
BY Emil Bonnelycke
ATTORNEY Patented June 23, 1925.

1,543,195

UNITED STATES PATENT OFFICE.

JENS PETER NIELSEN THYGESEN, ANDERS THEODOR SØRENSEN, AND NIELS PETER SØRENSEN, OF LANGAA, DENMARK.

DEVICE FOR CUTTING UP FETAL AND LIKE OBJECTS IN ANIMALS.

Application filed July 7, 1921. Serial No. 483,114.

*To all whom it may concern:*

Be it known that we, JENS PETER NIELSEN THYGESEN and ANDERS THEODOR SØRENSEN and NIELS PETER SØRENSEN, subjects of the King of Denmark, residing at Langaa, Denmark, have invented a device for Cutting Up Fetal and like Objects in Animals, of which the following is a specification.

The present invention relates to a device for cutting up fetal and like objects in animals and consists in the provision of a saw in the shape of a flexible cord guided in a tube or tubes at one end of which it forms a loop wherewith to embrace and cut the object against the end of the guide.

In the accompanying drawings the invention is illustrated,

Fig. 1 represents a side-view of the appliance, partly in section,

Fig. 2, a longitudinal section of the same, at right angles to Fig. 1,

Fig. 3, a cross-section on the line A—B of Fig. 1,

Fig. 4, a view showing the construction of the flexible saw, and

Figs. 5 and 6, views showing modifications of the guide tube.

The device consists of a flexible saw $o$ and a guide which may be composed of two interconnected tubes $a$ and $b$ at one end of which the saw forms a loop $p$. The tube ends from which the loop projects are formed with thick beads $c$, $d$, so that neatly rounded surfaces are produced all around the orifices $e$, $f$, the tubes being preferably connected by welding the beads $c$, $d$ together. The opposite ends of the tubes terminate in two interconnected sleeves $g$, $h$ which are also rounded off to reduce friction with the saw. A handle $i$ is secured to the cross-piece which connects the sleeves $g$, $h$. Two clamps $j$ and $k$ are adjustable on the tubes to which they can be secured by screws $l$ and $m$ respectively for steadying the tubes relative to one another. The clamp $j$ is formed with a pointed hook $n$. The saw has a spherical head $q$ at each end and is passed through operating-handles $r$ which are secured to the saw by means of clamp screws $t$. A cross-piece $u$ on each handle serves as a grip to allow the screw to be operated.

The saw is preferably composed of four piano-wires $v$ (Fig. 4) which are first twisted in pairs in one direction, the two pairs being then twisted together, in the opposite direction. The flexible twine $w$ thus formed will act abrasively when rubbed across a hard object.

In the use of the appliance, the loop $p$ is passed round the object to be severed for which purpose the saw cord $o$ may be removed from the guide tubes if necessary. Then, with the cord $o$ held in the guide, the object is attracted to the mouth-piece and, while the appliance is held by the handle $i$, the saw-cord is reciprocated by means of the handles $r$ until it has worked its way through the object.

As the object is held firmly against the mouth-piece of the guide tubes, the internal organs of the animal will not be subjected to any strain and they will also be protected by the tubes from contact with the saw. This is the case whether the loop $p$ works in the same plane as the tubes or at an angle to the same. In some cases an object may have to be cut which can be arranged parallel with the tubes. Such object, for instance a leg, is then attached to the hook $n$, the clamp $j$ being adjusted on the tubes and fixed in a suitable position.

Instead of the two tubes $a$, $b$ a single tube $x$ may be employed, as shown in Fig. 6, the separate passages $e$, $f$ for the saw being formed by a bridge-piece $y$ spanning the single orifice.

The tube or tubes may be composed of telescopically connected parts so that the length of the appliance can be varied according to requirements. The guide tubes may be composed of parts connected by means of flexible joints, for instance coil springs $z$, as shown in Fig. 5, so that the mouth-piece can bend in the direction in which the loop $p$ works.

The handle $i$ may be connected to the clamp $k$.

Having now particularly described and ascertained the nature of our said invention and in what manner the same is to be performed, we claim:—

A surgical device comprising two guide tubes integrally connected at their ends and having an enlarged portion at one end; cross pieces connecting said tubes; a handle on the other end of said tubes; and a saw cord carried in said guide tubes and forming a loop adjacent the enlarged end and having adjustable handles at each end of said cord.

JENS PETER NIELSEN THYGESEN.
NIELS PETER SØRENSEN.
ANDERS THEODOR SØRENSEN.

Witnesses:
M. E. BRONDUM,
E. GLASER.